United States Patent
Nath et al.

(10) Patent No.: US 9,213,757 B2
(45) Date of Patent: Dec. 15, 2015

(54) CONTENT CREATION

(71) Applicant: SAP AG, Walldorf (DE)

(72) Inventors: Kaushik Nath, Singapore (SG); Suresh Venkatasubramaniyan, Bangalore (IN)

(73) Assignee: SAP SE (DE)

( * ) Notice: Subject to any disclaimer, the term of this patent is extended or adjusted under 35 U.S.C. 154(b) by 336 days.

(21) Appl. No.: 13/729,041

(22) Filed: Dec. 28, 2012

(65) Prior Publication Data

US 2014/0188891 A1 Jul. 3, 2014

(51) Int. Cl.
*G06F 17/30* (2006.01)

(52) U.S. Cl.
CPC .... *G06F 17/30613* (2013.01); *G06F 17/30336* (2013.01)

(58) Field of Classification Search
None
See application file for complete search history.

(56) References Cited

U.S. PATENT DOCUMENTS

| 6,108,645 A * | 8/2000 | Eichstaedt et al. | 707/741 |
| 2013/0282605 A1 * | 10/2013 | Noelting | 705/321 |

OTHER PUBLICATIONS

Magnus Sahlgren, An Introduction to Random Indexing, SICS, Swedish Institute of Computer Science, pp. 1-9, Sweden.

* cited by examiner

*Primary Examiner* — Bai D. Vu
(74) *Attorney, Agent, or Firm* — Horizon IP Pte. Ltd.

(57) ABSTRACT

A system for facilitating content creation includes collecting profiles which are analyzed to build a profile parameter index. A dummy profile is created based on the profile parameter index. The dummy profile is a fictitious character having profile parameters based on input from a user of the profile parameter index. The control of the dummy profile is under the user.

19 Claims, 16 Drawing Sheets

220a

220a

220b

260

CONTENT CREATION

TECHNICAL FIELD

The present disclosure relates generally to content creation of social platforms. In particular, the present disclosure relates to character creation and using such characters to create content in social platforms.

BACKGROUND

Numerous social platforms currently exist. Social platforms, for example, enable people to interact, such as create, share, exchange and comment on contents among members or users in virtual communities. There are different types of social platforms. Such social platforms, for example, may include collaborative projects, blogs, social networking, professional networking, as well as others. Members of conventional social platforms have established accounts. A member controls the contents of his/her account.

We have discovered that social platforms may be a vehicle for effectively developing and depicting scenarios. The scenarios may be used to simulate situations to understand causes and effects, facilitating decision making. However, conventional social platforms lack a framework to create fictitious characters and content controlled by a member to develop and depict scenarios. This may inhibit the ability to effectively communicate situations and subsequently affecting sound decision making.

It is therefore desirable to provide methods and tools for character and associated content creation in social platforms.

SUMMARY

A computer-implemented technology for facilitating content creation is described herein. The method includes collecting profile pages. The method also includes analyzing profile pages to build a profile parameter index using random indexing. The profile parameter index includes vectors having d elements, wherein s/2 random elements of the d elements are selected to be equal to +1, where s is a seed number, s/2 random elements of the d elements are selected to be equal to −1, and remaining d elements is equal to 0. The method also includes creating a dummy profile based on the profile parameter index. The dummy profile is a fictitious character having profile parameters based on input from a user of the profile parameter index. The control of the dummy profile is under the user.

In one embodiment, a computer-implemented method for content creation is described herein. The method includes collecting profiles. The method also includes analyzing profiles to build a profile parameter index. The method also includes creating a dummy profile based on the profile parameter index. The dummy profile is a fictitious character having profile parameters based on input from a user of the profile parameter index. The control of the dummy profile is under the user.

In one embodiment, a non-transitory computer-readable medium having stored thereon program code is disclosed. The program code is executable by a computer to collect profiles. The program code is also executable by the computer to analyze profiles to build a profile parameter index and create a dummy profile based on the profile parameter index. The dummy profile is a fictitious character having profile parameters based on input from a user of the profile parameter index. The control of the dummy profile is under the user.

In yet another embodiment, a system is disclosed. The system includes a non-transitory memory device for storing computer-readable program code. The system also includes a processor in communication with the memory device. The processor is being operative with the computer-readable program code to collect profiles, analyze profiles to build a profile parameter index and create a dummy profile based on the profile parameter index. The dummy profile is a fictitious character having profile parameters based on input from a user of profile parameter index. The control of the dummy profile is under the user.

A computer implemented framework is proposed which facilitates creation and storage of a profile as an embodiment of above mentioned fictitious character.

In one embodiment, the proposed framework is able to create, modify or delete a profile residing in an external framework. In one embodiment, examples of such external framework can be social media which are accessible by public. In a different embodiment, such social media can also be accessible by a restricted user group.

In one embodiment, the administrative owner of the proposed framework is different from the administrative owner of the external framework. Examples of such external framework can be social media which are accessible by public. In a different embodiment, such social media can also be accessible by a restricted user group.

In one embodiment, the proposed framework is able to create, modify or delete multiple profiles residing in multiple external frameworks. Examples of such external framework can be social media which are accessible by public. In a different embodiment, such social media can also be accessible by a restricted user group.

In one embodiment, the framework facilitates content creation. Such contents may be textual or graphical or audio expressions, stored in any type of computer memory, representing verbal or mental expressions of a particular character where the character is represented by the profile.

In one embodiment, textual, graphical or audio contents are associated with a profile. The association of any such content with a profile is shown through visual nearness representing the expression to be made by the character where the character is represented by the profile.

In one embodiment, a sequence of expressions associated with different profiles, can represent an interactive communication among the characters involved. In such a sequence of an interactive communication, it is also possible for repetition of expressions from one particular character.

In yet another embodiment, a methodology is proposed where style of expressions of a character is measured with its previously associated expressions. Methodology from literary stylometry analysis is used to measure uniformity in expressions of a particular character or any deviation from previous style.

In one embodiment the proposed framework is able to create, modify or delete multiple contents residing in multiple external frameworks. Correspondence between a profile in the proposed framework and a profile in the external framework is maintained. Correspondence in associated contents of a particular profile in the proposed framework and associated contents in the external framework is also maintained. Contents associated with any particular profile in any of the mentioned external frameworks are controlled from the proposed framework.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

A framework or application for creating content is described herein. The content creation framework may be used, for example, to create characters in social media network portals. In one embodiment, the framework may be used to create dummy profiles. Such dummy profiles may be used to represent fictitious characters. The framework facilitates controlling multiple fictitious characters and their contents from a single accessible window. The fictitious characters may possess relationships among themselves. For example, a profile or multiple profiles can indicate connectivity with other profiles within target social platforms. The framework facilitates generating any desired connection between any of the fictitious characters.

Figure 1A:
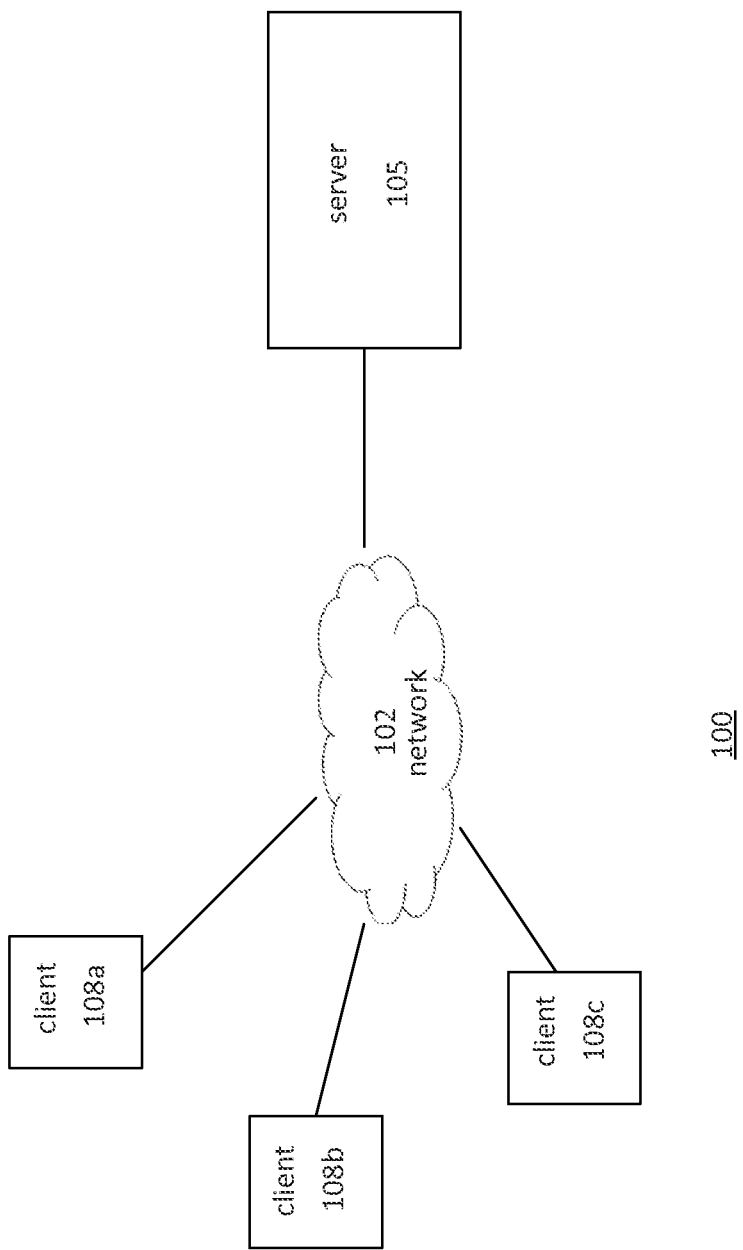
FIG. 1A shows an exemplary embodiment of a framework environment.

FIG. 1A shows a block diagram of exemplary environment 100 of a framework. The framework environment, for example, facilitates creation of fictitious characters and content creation in a social media network. The framework environment may have a client/server (C/S) architecture. For example, the environment may be a distributed client/server architecture. In one embodiment, the environment includes one or more clients 108a-c and a server 105 communicatively coupled via a communication network 102. Clients 108a-c may access the server 105 to store information and/or retrieve information maintained on the server. Furthermore, the server may facilitate communication between clients. Other types of environments may also be useful. For example, the environment may be a cloud computing environment.

The communication network, for example, may be a local area network (LAN) which interconnects different devices, such as the clients and server. Other types of networks may also be useful. The devices may be coupled via the network by wireless and/or wired connections.

The server, in one embodiment, may be a computer which includes a memory and a processor. The server is configured to transmit, receive, process and store information or data associated with the environment. Various types of computers may be employed. For example, the computer may be a mainframe, workstation, as well as other types of processing devices. The server may be adapted to execute any operating system. For example, the operating system of the server may be z/OS, Linux-Intel, Linux/390, UNIX, or Windows Server. Other types of operating systems may also be used. The server may also include or be communicatively coupled with a web server and/or a Simple Mail Transfer Protocol (SMTP) server.

Although the environment is illustrated with one server, it is understood that more than one server, such as a server pool, as well as computers other than servers, may be employed.

The memory of the server may include any non-transitory memory or database module. The memory may be volatile or non-volatile types of memories, such as magnetic media, optical media, random access memory (RAM), read-only memory (ROM), removable media, or any other suitable local or remote memory component.

A client may be a local or remote computing device with, for example, local memory and a processor. The memory may include fixed and/or removable storage media such as a magnetic computer disk, CD-ROM, or other suitable media. Various types of processing devices may serve as a client. For example, the client may be a PC, tablet PC, workstation, network computer, kiosk or personal data assistant (PDA). Other types of processing devices may also be used. The processing devices may include a memory and a processor. Input and output devices may be provided for the processing device. The input device may be, for example, a keypad, touch screen, mouse, or other device that can accept information from a user. For example, a client may receive requests from a user using the input device. The output device may be a display to convey information to a user. Other types of input and output devices may also be useful. The clients can receive, transmit, process and store any appropriate data associated with the environment 100.

Client/server (C/S) applications may be provided in the environment. Generally, C/S applications include frontend and backend portions. The frontend portions are stored locally on the clients while the backend portions are located in the server. Various types of C/S applications may be provided in the environment.

A client may include a user interface for a user to interface with the environment for various purposes. For example, the interface may be used to access various applications in the environment. The user interface may also serve other purposes. In one embodiment, the user interface comprises a graphical user interface (GUI). A GUI may provide an efficient and user-friendly manner of presenting information or communicating with the environment. For example, a GUI may include a task menu as well as one or more panes for displaying information. Other types of user interfaces, such as command line interface (CLI), may also be useful. The type of user interface may depend on the type of application running on the client. For example, the frontend portion may include a GUI to enable a user to interact with the backend portion to access data stored in the server.

Although the environment is shown with three clients and one server, it is understood that there may be any number of clients communicatively coupled to one or more servers. Additionally, other types of devices may be included. The clients may be local or external clients. Furthermore, "client" and "user" may be used interchangeably as appropriate without departing from the scope of this disclosure. For example, a client may be used by one or more users while a user may use one or more clients. As an illustration, a user may have a user account for an application, such as the email system. Any user may access the user's respective account from any client by performing an authentication or a login process, such as providing a user name and password.

Figure 1B:
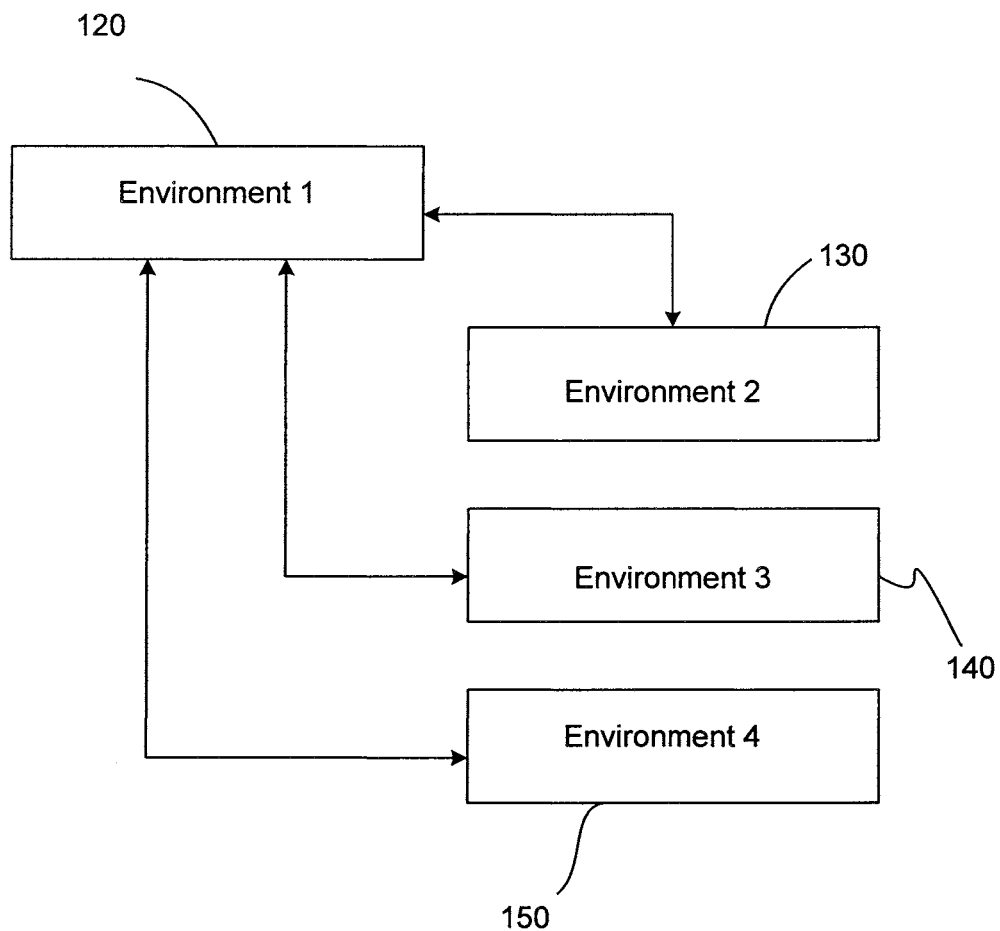
FIG. 1B shows an exemplary interaction of a framework environment with external environments.

FIG. 1B shows an exemplary embodiment of multiple environments 110. As shown, a framework environment 120 is provided. The framework environment may have a client/server architecture, as described in FIG. 1A. The framework environment facilitates content creation for a social platform, including fictitious characters, relationships and interactions among such characters. Content creation may also include other activities related to the fictitious characters. The framework environment, as shown, connects to external environments 130, 140 and 150. Illustratively, the framework environment connects to three external environments. Providing other number of external environments may also be useful. The external environments to which the framework environment connects may be referred to as target environments. The external environments, for example, may be different social platforms. For example, the external environment may be different social media and/or professional networks portals. Other types of platforms may also be useful. The content created in the framework environment may be published in any of the target environments.

As described, the framework environment is separate from the external environments of the social platforms. Content created in the framework environment may be published in a target environment. For example, a user may create content in the framework environment and wish to publish the information in the first external environment. The first external environment or target environment, for example, may be Facebook. The user may use an application programming interface (API), such as the POST call structure to create content in the target environment. In this manner, content from the framework environment is published in the target environment. Fictitious characters may appear to be real characters in the target environment. In some target environments, the real user may need to disclose if a character is fictitious. In such case, the fictitious characters are known to be fictitious to the members of the target environment.

In an alternative embodiment, the framework environment may itself be a social platform. In this case, the content may be created and published in the same environment. Furthermore, a user may further publish the content in an external environment, as previously discussed.

In one embodiment, the owner of the framework environment may be different from the owner of the external environment. The external environment may be a social platform owned by a third party. The external framework, for example, may be Twitter. In one embodiment, the external environment may be accessible by the public. For example, the tweets published on the external environment may be read by the public. Alternatively, the external environment may be accessible to a restricted group of users. For example, the tweets published on the external environment can only be read by a restricted group of users who have granted an access by the owner of the framework environment.

Furthermore, the framework environment is able to create, modify and delete a profile or multiple profiles published in an external environment. As such, correspondence between a profile in the framework environment and a profile in the external environment is maintained. In one embodiment, correspondence between associated contents of a profile in the framework environment and associated contents of a profile in the external environment is also maintained. As such, the contents associated with the profile in the external environment are controlled from within the framework environment.

Figure 2A:
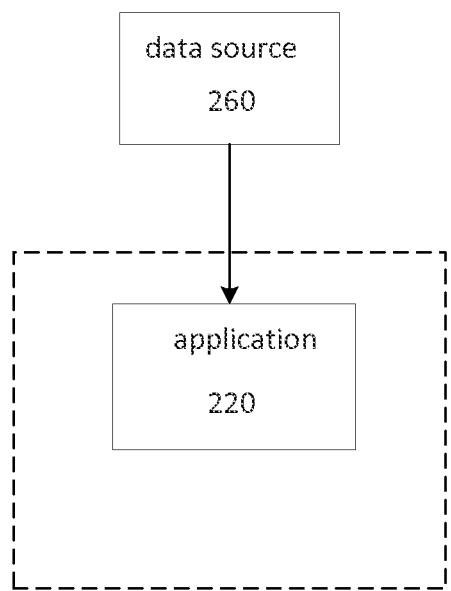
FIG. 2A shows an embodiment of a software environment.

FIG. 2A shows an embodiment of a software environment 200. As shown, the software environment includes a software application 220 and a data source 260. In one embodiment, the software application is a content generation (CG) application. The CG application, for example, is used to generate content for one or more social platforms, including fictitious characters, relationships and interactions. Content creation may also include other activities related to the fictitious characters. The content created by the CG application may be stored in the data source. The content may be stored as objects. Storing the content in other forms may also be useful.

In one embodiment, the software environment has a C/S architecture. For example, the CG application may have a frontend component located at a client and a backend component located at the server. The content is created by the frontend component and stored in or retrieved from the data source in the server by the backend component. Other configurations of the software environment may also be useful.

Figure 2B:
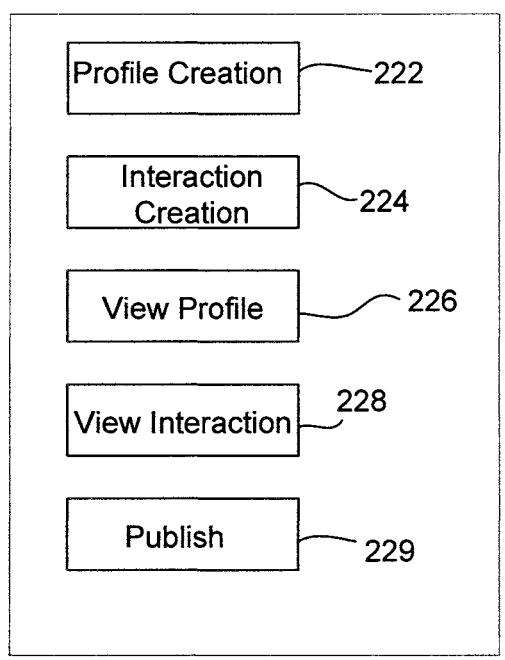
FIGS. 2B-D show details of frontend, backend and data store of the software environment of the framework.

FIG. 2B shows an embodiment of a frontend component 220a of a CG application. The frontend component includes various modules related to content creation. In one embodiment, the frontend component includes a profile creation module 222 and interaction creation module 224. The profile creation module is used to generate dummy profiles. As for the interaction creation module, it creates interaction elements for dummy profiles. The frontend component may also include viewing modules 226 and 228 for viewing dummy profiles and interaction elements of a dummy profile. Additionally, the frontend component includes a publishing module 229 for publishing interaction elements into a target environment. Providing other modules for the frontend component may also be useful. In one embodiment, the frontend component includes a user interface. The user interface may be, for example, graphical user interface (GUI) that facilitates profile creation and visualization of interactions.

Figure 2C:
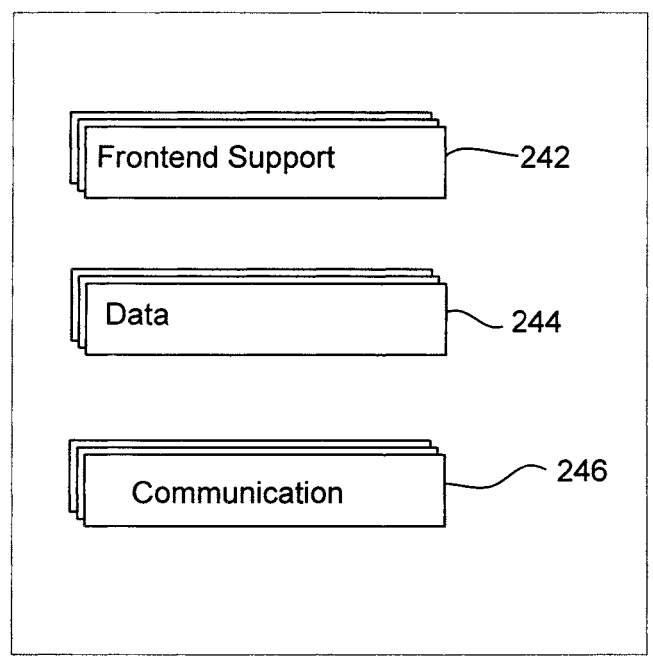

FIG. 2C shows an embodiment of a backend component 220b of a CG application. In one embodiment, the backend component includes frontend support modules 242. The frontend support modules support functions of the frontend component. The backend component also includes data module 244. The data module stores content created from the frontend module in the data source as well as retrieving data content from the data source for use by the frontend component. Additionally, the backend component includes a communication module 246. The communication module facilitates connection with individual target social platforms. For example, different platforms may require different communication protocols. The communication module can be used to facilitate one-to-one connection with a first target social platform using a first communication protocol and a second target social platform using a second communication protocol in accordance with compatibility requirements. Providing other modules for the backend component may also be useful.

Figure 2D:
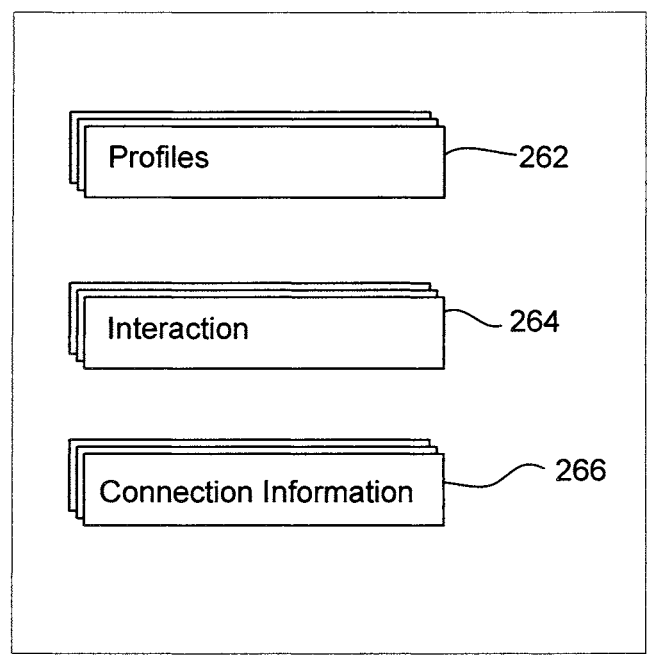

FIG. 2D shows an embodiment of content stored in the data source 260 in the server. In one embodiment, the data source includes profiles 262, interaction elements 264 and connection information 266, such as login information of profiles for various social platforms. Storing other types of content in the data source may also be useful. The content stored in the data source may be objects. For example, the content may be stored as first class objects. Storing content in the data source in other forms may also be useful.

The data structure may be, for example, a composite structure. Providing other types of data structure may also be useful. For example, each of the profiles owns an interaction page. The ownership is defined by a link between the profile and its interaction page. In one embodiment, the ownership is an exclusive type ownership. The interaction page includes a collection of interaction elements. In one embodiment, the interaction elements are stored as objects in the data source. Each of the interaction elements includes a link to its corresponding interaction page. For an illustration, an interaction page is a message thread of a discussion forum hosted on a social platform. The owner of the message thread is the profile which creates the message thread, and therefore, the ownership is exclusive. The message thread may contain one of more messages. The one or more messages are the interaction elements. Each of the messages may be posted by one or more profiles. As such, an interaction page which is exclusively owned by a profile includes a collection of interaction elements which belong to one or more profiles.

The CG application, as discussed, is a tool which facilitates the generation of dummy profiles. For example, the profile creation module may be used to generate dummy profiles. A profile may be considered as a metaphor that represents an entity, such as a person. For example, an entity's preferences, attributes, and characteristics constitute the entities profile, which represents the entity to the external world. As for a dummy profile, it includes preferences, attributes and characteristics of a fictitious entity.

Figure 3:
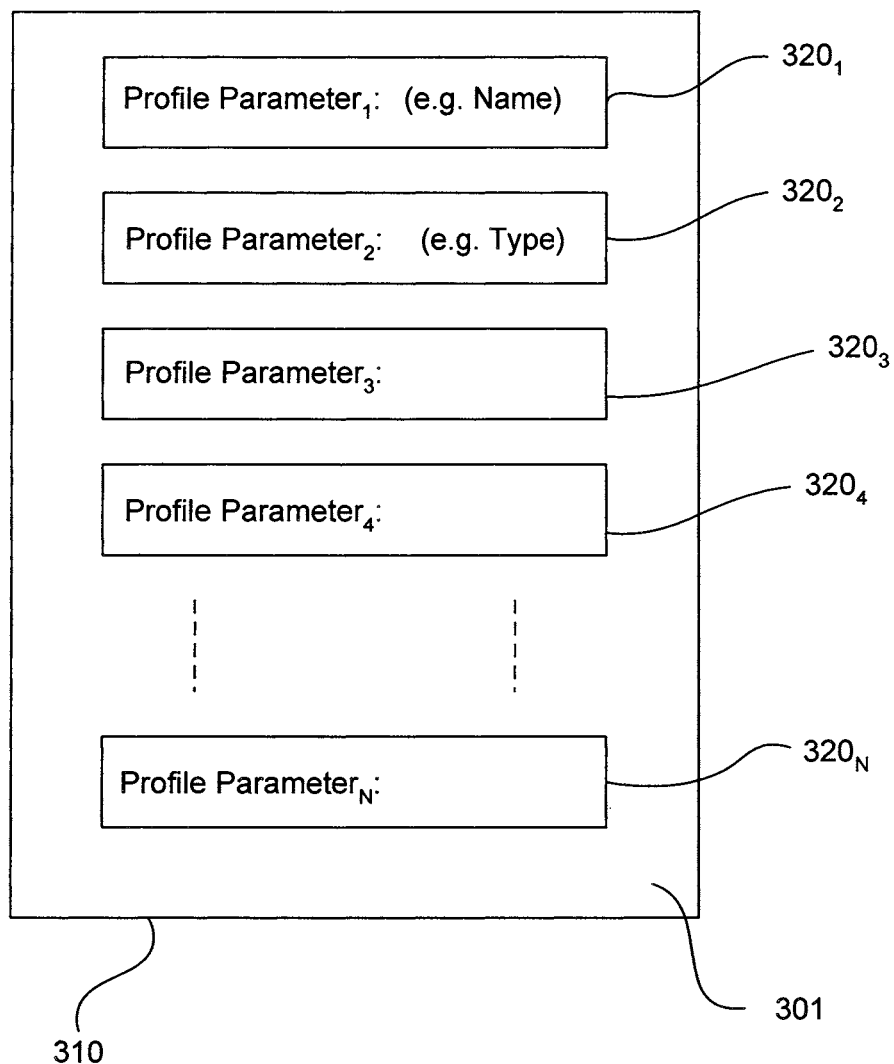
FIG. 3 shows an exemplary profile.

FIG. 3 shows an exemplary profile 310. A profile is an entity within a framework enabling social media or social network. As shown, a profile includes a plurality of profile parameters $320_{1-N}$. The profile parameters constitute the profile. The profile parameters of a profile may be provided in a profile page 301. For example, a profile page may be commonly shown as one page or a set of pages of a browser.

A profile parameter includes a profile parameter name and profile parameter value. The profile parameter name is the name or identity of the profile parameter. A profile parameter value is a single value associated with an instance of a profile parameter name. A profile parameter value may be a word, a phrase, a number or a combination thereof.

A profile parameter may have different structures. For example, the profile parameter may have a composite structure. In other cases, the profile parameter may have multiple values. A ranking may be provided to denote a comparative value between any two values, such as preference for one over the other. Other types of parameter structures may also be provided.

Illustratively, the first profile parameter $320_1$ may be name, indicating that the value of the first profile parameter is the name of the profile. The profile name is used to identify the profile. The first profile parameter may have a composite structure. For example, the name of the profile may contain a first name, a last name and optionally a middle name. However, the different components of the name are considered a single instance or a single value. The second profile parameter $320_2$ may be type, indicating that the value of the second profile parameter is the type of the profile. A profile type may, for example, include an individual, organization, product or place. Other profile types may also be useful.

As for other profile parameters, they may relate to position, title, current geographical location, hometown, birth place, gender, age, ethnicity, education, skills, industry sector and interests. Some of these parameters may contain multiple values. For example, skills and interests may contain multiple parameter values. Providing a profile with other profile parameters or profile parameter structures may also be useful.

Figure 4:
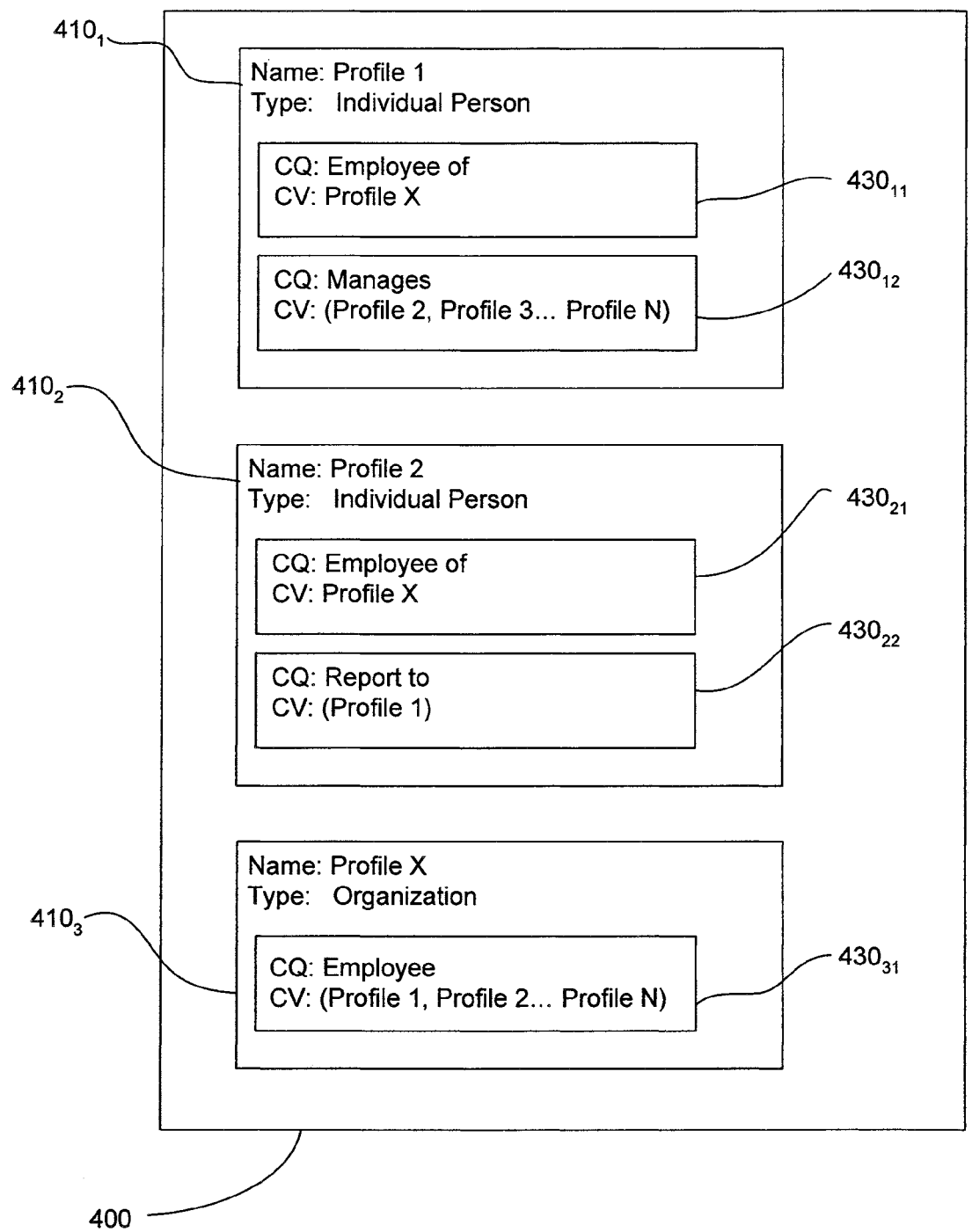
FIG. 4 shows an exemplary embodiment of profiles and interrelationships within a social network or professional network.

Profiles, for example, form entities within a social network. The social network, for example, may be any social network, including professional network. FIG. 4 illustrates various profiles and interrelationships within the social network 400. As shown, the social network includes Profile 1 $410_1$, Profile 2 $410_2$ and Profile X $410_3$. Profile 1 and Profile 2 represent individual persons (e.g., type=individual person) while Profile X represents an organization (e.g., type=organization). Both individuals 1 and 2 are employees of organization X. Individual 1 is a manager at organization X while individual 2 is managed by individual 1 at organization X.

As shown, the profiles may include one or more connectivity qualifier and connectivity value (CQ-CV) pairs. The CQ indicates the type of connections to other profiles and the CVs indicate the profile or profiles connected by the CQ. Profile 1 has two CQ-CV pairs $430_{11}$ and $430_{12}$. In the first CQ-CV pair, CQ indicates that individual 1 is an employee of while CV provides the value, which is Profile X. The second CQ-CV pair relates to the employees of which Profile 1 manages. For example, individual 1 manages Profile 2, Profile 3 . . . Profile N. Profile 2 also has two CQ-CV pairs $430_{21}$ and $430_{22}$. In the first CQ-CV pair, CQ indicates that individual 2 is an employee of Profile X. The second CQ-CV pair relates to the manager which individual 2 reports to. For example, individual 2 reports to Profile 1. As for Profile X, it has one CQ-CV pair $430_{31}$, which is its employees, such as Profile 1, Profile 2 . . . Profile N.

As discussed, the framework facilitates the creation of dummy profiles. Dummy profiles are created by and remained under the control of real users in the social network. For example, a real user may own one or more dummy profiles.

Figure 5:
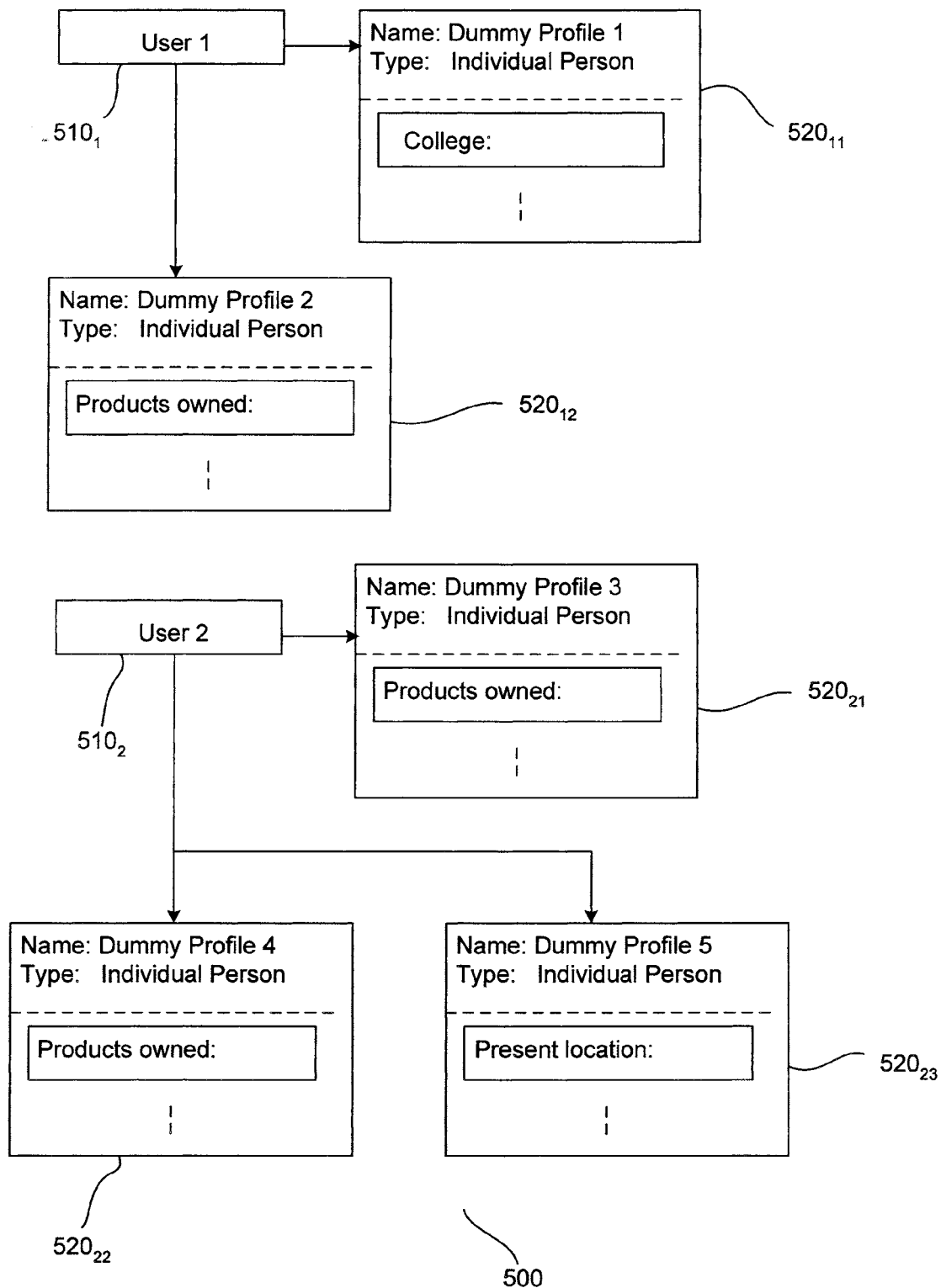
FIG. 5 illustrates an exemplary embodiment of relationships of dummy profiles to owners within a framework for character and content creation.

FIG. 5 illustrates an example of relationships of dummy profiles to owners in a social network 500. As shown, the social network includes first and second real users $510_{1-2}$. The real users each include profiles (not shown). For example the first user may be represented by Profile 1 and the second user may be represented by Profile 2. The profiles, for example, include profile parameters and values reflective of the real users.

The first real user illustratively created Dummy Profile 1 $520_{11}$ and Dummy Profile 2 $520_{12}$. As such, the first real user owns and controls Dummy Profile 1 and Dummy Profile 2. The dummy profile parameters and values of Dummy Profile 1 and Dummy Profile 2 are reflective of those desired by the first real user. The second real user illustratively created Dummy Profile 3 $520_{21}$, Dummy Profile 4 $520_{22}$ and Dummy Profile 5 $520_{23}$. The dummy profile parameters and values are reflective of those desired by the second real user.

In one embodiment, a profile parameter index is created. The profile parameter index facilitates the framework in creating dummy profiles. In one embodiment, the profile parameter index may be created using random indexing. Random indexing is described in, for example, Sahlgren, *An Introduction to Random Indexing*. In: Methods and Applications of Semantic Indexing Workshop at the 7th International Conference on Terminology and Knowledge Engineering, 16 Aug. 2005, Copenhagen, Denmark, which is herein incorporated by reference for all purposes. Forming the profile parameter index using other indexing techniques may also be useful.

Figure 6:
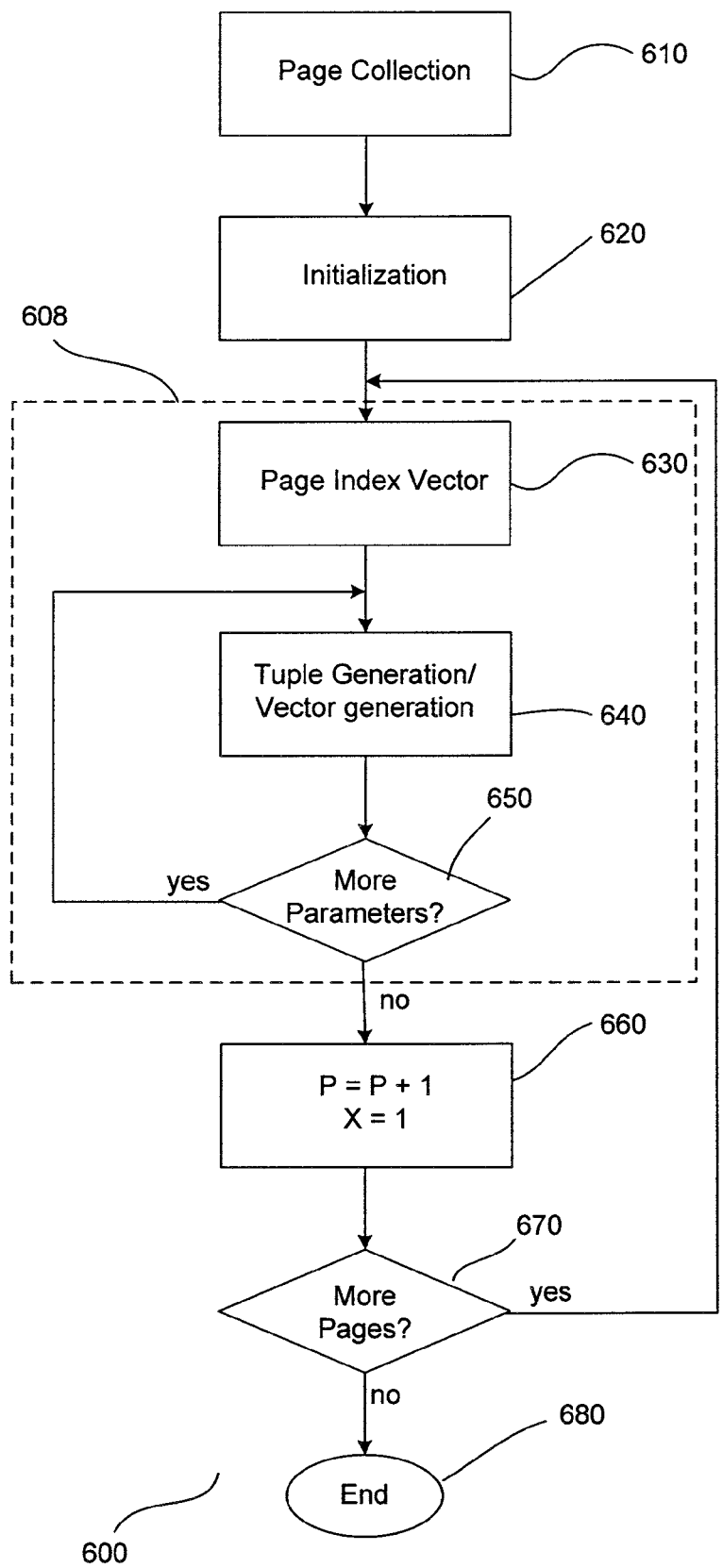
FIG. 6 shows an exemplary embodiment of process for creating a profile parameter index.

FIG. 6 shows a process 600 of an embodiment for creating a profile parameter index. The process includes collecting a plurality of profile pages at step 610. For example, y profile pages are collected. The number of profile pages should be sufficient for random indexing. For example, the number of profile pages should be at least about 1000 pages (e.g., y=1000). Collecting other number of profile pages may also be useful. The profile pages may be collected using various techniques. For example, the profiles may be collected from the public domain, including the web, through an agency which compiles profile data for individuals, or a combination thereof. Other techniques or combination of techniques for collecting profile pages may also be useful.

At step 620, initialization is performed. Initialization, for example, includes setting various elements of the process to their initial states. For example, counters, such as profile page counter p and profile parameter counter m are set to their initial states, such as 1. The profile parameter index and tuple array or set are initialized to be empty. Additionally, index parameters for random indexing, such as vector dimension d and seed size s are chosen. The value of d should be sufficiently large. For example, d is a sufficiently large integer, such as 250, 1000 or 4000. Other values for d may also be useful. As for s, it should be a small even integer. For example, s may be between about 10-20. Other values for s may also be useful. The value of s, for example, may depend on the specific application.

After initialization, the process commences profile parameter index creation 608. Profile parameter index creation, in one embodiment, is performed one page at a time. The page being analyzed may be referred to as the current profile page.

In one embodiment, the profile parameter index is a collection or a matrix of normalized vectors of real numbers. The vectors of the matrix, in one embodiment, are unique vectors. For example, no two vectors in the matrix have the same value. A vector forms, for example, a column of the matrix. Alternatively, a vector may form a row of the matrix. The matrix, in one embodiment, is created using random indexing. Random indexing is adapted for fitness for creating the profile parameter index.

A vector of the profile parameter index has a corresponding tuple from a set of tuples. A tuple contains a profile parameter and corresponding profile parameter value from the profile parameter pages. The set of tuples are unique tuples. For example, no tuple in the tuple set has the same profile parameter and value as another tuple within the tuple set. The tuple set is generated by dynamically growing an array of tuples. For example, a tuple forms a column or a row of the tuple array.

In one embodiment, a unique tuple is assigned a unique vector. For example, a unique tuple has a corresponding unique vector. For example, the $i^{th}$ element of the tuple array corresponds to the $i^{th}$ element of the matrix of vectors.

In one embodiment, when a current chosen page is processed, a profile page index vector Dp is created at step 630. The profile page index vector has a size d (e.g., d elements), which is initialized to be all zeros. The initialized profile page index vector has s/2 number of randomly chosen elements set as +1 and s/2 number of randomly chosen elements from the remaining elements (e.g., d–s/2) as –1. Implementation of Dp is also made through an array of real numbers. For example, all elements of the profile page index vector are zero except for those elements randomly selected to be +1 and –1. The profile page index vector need not be stored and can be regenerated iteratively for each page.

A profile parameter in the current profile page is processed to generate a tuple and its corresponding vector at step 640. As discussed, a profile page includes a plurality of profile parameters. The parameters of the current chosen profile page are processed one parameter at a time. The profile parameter which is processed may be referred to as the current chosen profile parameter. In one embodiment, the profile parameters of a current chosen profile page p are processed in sequence from the first to the last parameter.

If the current chosen profile parameter results in a unit tuple, an initial corresponding parameter vector I is generated. An initial parameter vector for the current parameter of the current page is generated. The initial parameter vector I, in one embodiment, has a size d and implemented through an array of real numbers. The initial parameter vector may be generated similarly as the profile page index vector. The parameter vector I is then combined with Dp to form the final parameter vector W. For example, the final parameter vector W is equal to I+Dp.

The tuple and final parameter vector W are updated to the tuple array and parameter profile index matrix. For example, the tuple form a column in the tuple array and vector W form a corresponding column in the profile index matrix. It is understood that the tuple can form a row in the tuple array and vector W forms a corresponding row in the profile index matrix. Alternatively, one can form a row while the other forms a column or vice-versa. The tuple and final parameter vector form a ith element in the tuple array and profile index matrix. For example, the $i^{th}$ element of the tuple array corresponds to the $i^{th}$ element of the matrix of vectors.

The process proceeds to step 650 to determine if there are more parameters to process in the current profile page. The process returns to step 640 if there are more parameters to process. Steps 640 and 650 are repeated until all parameters in the current chosen profile page have been processed.

After all parameters have been processed, the process continues, for example, to step 660. At step 660, the process sets the necessary counters for processing the next profile page, if any. For example, the page counter is incremented and the parameter counter is reset to 1. The process then proceeds to step 670 to determine if there are more profile pages to process. For example, the process determines if the page counter is greater than the number of pages. If there are more profile pages to process, the process returns to step 630. Steps 630-670 are repeated until all profile pages have been processed. After all profile pages have been processed, the process terminates at step 680, completing the profile parameter index and tuple array creation. In one embodiment, the profile matrix has u columns, where u is equal to the number of unique tuples and d rows, where d is equal to the vector size. Alternatively, the profile matrix has u rows, where u is equal to the number of unique tuples and d columns, where d is equal to the vector size.

To illustrate, assume that the first profile page is the current chosen profile page. For example, the page counter p=1. For the current chosen profile page, the first profile parameter (m=1) is taken and separated into profile parameter name P1 and profile parameter value, V1. For example, the first parameter may have P1="Name" and V1="Jonathan Sox". The tuple (P1, V1) is added to the array representing the tuple set and is the first member of the tuple set. At this stage, the tuple set can be {("Name", "Jonathan Sox")}. The first element of the profile parameter index is also created. For example, the initial profile parameter vector I1 corresponding to (P1, V1) is generated. The profile parameter vector I1 has real numbers of size d. The profile parameter vector is implemented through an array of real numbers and is created similarly as the profile page index vector. For example, the initial profile parameter vector has its d elements initialized to zero, with s/2 randomly selected elements set to +1 and another s/2 randomly selected elements set to −1. The vector I1 is than combined with D1, which is the profile page index vector for the first profile page to form W1. At this stage, the profile parameter index matrix has, for example, one column, namely column 1, corresponding to the tuple (P1, V1), where column 1 is represented by W1.

For the first chosen profile page, if there is a second profile parameter, the corresponding tuple (P2, V2) is created. If tuple (P2, V2) is unique to the tuple set, it is added. For example, P2="Location" and V2="Danbury". At this stage, the tuple set may include {("Name", "Jonathan Sox"), ("Location", "Danbury")}. The second element of the profile parameter index is created.

If the tuple (P2, V2) is unique, a corresponding initial vector I2 of real numbers of given size d is created. The vector I2 is combined with D1 to form W2. The tuple (P2, V2) and W2 is added to the tuple array and profile parameter index matrix. At this point, the profile parameter index matrix has two columns, namely column 1 and column 2, corresponding to the tuples (P1, V1) and (P2, V2), where column 1 is represented by W1 and column 2 is represented by W2.

On the other hand, if tuple (P2, V2) is not unique, it is not added to the tuple set. The vector W of the tuple which (P2, V2) is a match is replaced with W+D1. Processing continues until all profile parameters of the first profile page has been processed.

After the first profile page has been processed, the next profile page is similarly processed. For example, the profile page index vector for the next profile page is generated along with its profile parameters. This process continues until all profile pages have been processed.

For example, assuming that the $p^{th}$ profile page is processed. Profile page index vector Dp is generated. The parameters of the $p^{th}$ profile page are processed, for example, from the first to last. For example, the current chosen parameter is the jth parameter from the sequence of parameters. The current chosen parameter is processed to form tuple (Pj, Vj). If tuple (Pj, Vj) does not match any of the tuples in the set of tuples, it is unique and added to the tuple set. A corresponding profile parameter vector Wj is generated and added to the profile parameter index. The vector Wj may be generated as previously described. For example, an initial vector Ij is created and added to Dp to form Wj. On the other hand, if tuple (Pj, Vj) matches a tuple already in the set of tuples, such as (Pk, Vk), Wk is retrieved from the matrix and then replaced with Wk+Dp.

For every profile page, each profile parameter is thus made into tuples, searched in the tuple set and if they already exist, the corresponding profile parameter index vector is updated with adding the index vector corresponding to the profile page. If the tuple is found unique, a new vector of real numbers of size d is created and initialized to zero for all elements and then added with the index vector of the corresponding profile page and the result of the addition is used to replace the vector corresponding to the new tuple in the profile parameter index. After all profile pages and their corresponding profile parameters are exhausted, the construction profile parameter index matrix is completed.

In determining unique tuples, hierarchical and equivalent parameters and values should be taken into consideration. Hierarchical parameters are those parameters whose values have a hierarchical structure. For example, the parameter "skills" may have a value "programming in Script Languages" and "programming in Java". These two values are types of the general skill programming while Script Languages and Java are specific types of programming languages. In one embodiment, for hierarchical parameters, each element for each layer can be used for the name value pair tuple. In the case of the values "Java programming" and "programming in Java" they may be considered equivalents. Equivalent profile parameter values can be considered a single entity.

Some profile parameters may be grouped into categories. In one embodiment, profile parameters having numbers as its values may be grouped into categories. For example, age parameter may be grouped into student, early career and near retirement age. Other examples may include income, where numbers are grouped into low, medium and high income.

Figure 7:
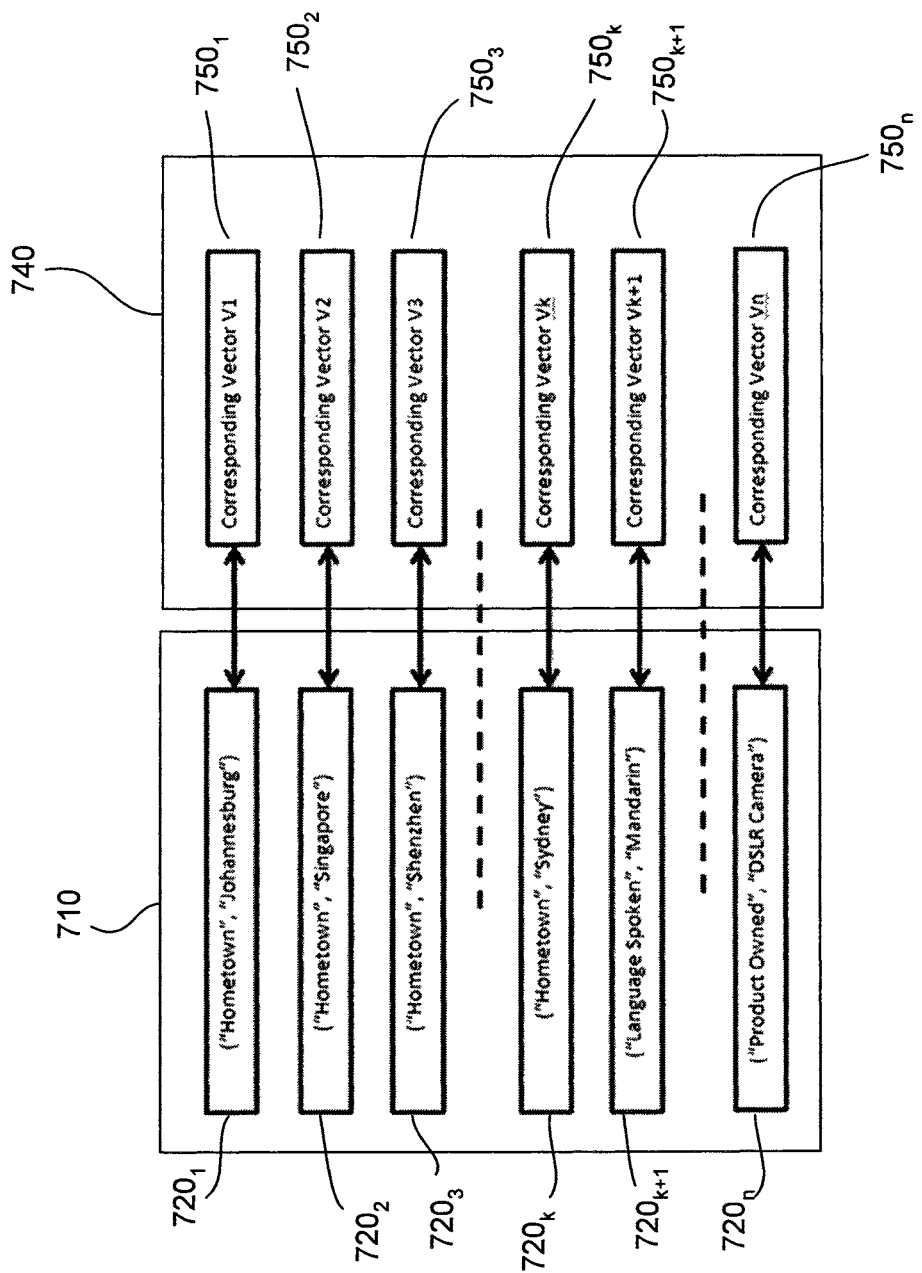
FIG. 7 shows an exemplary embodiment of a profile parameter index matrix.

FIG. 7 shows an example of a profile parameter index matrix 740. The matrix includes a plurality of vectors $750_{1-n}$. A vector has d elements. The value d, for example, is equal to 1000. The vectors of the matrix are normalized vectors. For example, the sum of the elements of a vector is equal to 1. Also shown is a tuple array 710 having a plurality of unique tuples $720_{1-n}$. The unique tuples are derived from all the collected profile pages. A unique tuple has a corresponding vector in the profile parameter matrix.

As discussed, the framework provides a platform for creating dummy profiles. For example, the framework provides a platform for creating dummy profiles in social network portals. Furthermore, the framework enables creation of a single dummy profile or multiple dummy profiles at one time. The dummy profiles may be created manually or automatically.

Figure 8:
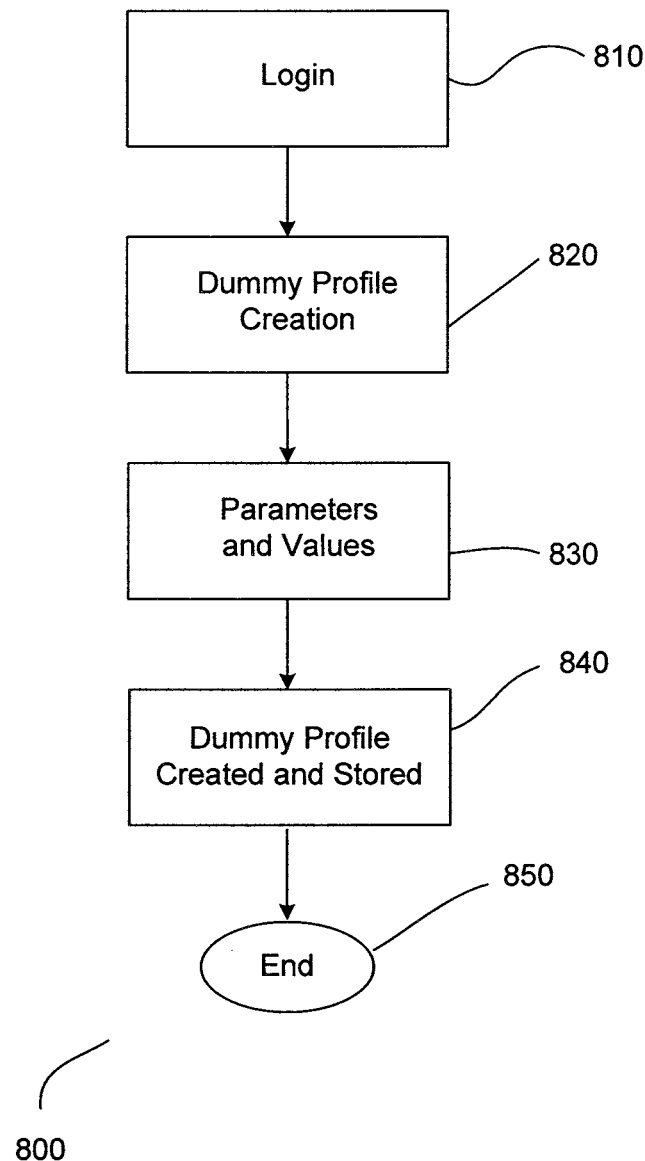
FIG. 8 shows an exemplary embodiment of a process for manually creating a dummy profile.

FIG. 8 shows an embodiment of a process 800 for manually creating a dummy profile in the framework. The framework includes a CG application. In one embodiment, a real user logs into the framework at step 810. The real user, for example, is a real person having an account established in the framework. For example, the user is a real user having a real user profile, including a username and password. The real user, for example, accesses the homepage of the framework and initiates the login process. The user may enter the username and password to log in to the framework's user interface (UI). Once authenticated by the framework, the user is logged in. Once logged in, the user obtains authorship and responsibility over his/her actions.

At step 820, the user initiates a dummy profile creation process to create a dummy profile. The dummy profile creation process may be initiated through an event. For example, the user may click on a menu bar or command button on the framework's UI. Other approaches for initiating the dummy profile creation process may also be useful. For example, the user may issue a command or calling an application programming interface (API) through a remote or message passed call. A dummy profile is created in the context and under the authenticated usage of the real user profile. The dummy profile remains within the scope of the real user profile.

In one embodiment, the user provides parameters and values of the dummy profile at step 830. For example, the user inputs the parameters and values into the framework. In one embodiment, the user may input parameters and their associated values. In other embodiments, the framework may provide a list of suggested parameters for the user to select and the user provides their associated values. Providing a combination of user provided and framework suggested parameters which the user provides the associated values may also be useful. For example, a user may have alternatives to add profile names and values in the event the framework does not suggest the appropriate profile names.

In one embodiment, the user may provide the parameters and values one pair at a time. This can be achieved through an API where profile parameter and profile parameter values are provided pairwise. When all parameters and values are provided, the process proceeds to step 840. Alternatively, the parameters and values may be provided together. For example, the parameters and values are provided together by the user. The user can also provide the desired profile parameters and corresponding profile parameter values either through a screen or with the help of an XML document. In other embodiments, user selects parameters and provides parameters and their values. Providing parameters and values may be achieved sequentially, together or a combination thereof. Other techniques for providing profile parameters and values may also be useful. In one embodiment, for the case where one or more profile parameters are repeated, multiple profile parameter values are assigned to the profile parameter.

At step 840, the profile parameters and corresponding profile parameter values are assigned to a data structure designated to store the dummy profile. Additionally, the framework may be provided with login information, such as username and password for one or more external social portals where the dummy profile is intended to exist as a fictitious user profile. The process terminates at step 850 after creating and storing the dummy profile.

In one embodiment, access permission to use a created dummy profile is restricted to the real user profile that created it. In some cases, the framework may provide data structures and methodologies for a different real user to obtain permission for using the dummy profile. Such permission can be granted for certain time duration as agreed by the original user who is the creator of the dummy profile. The access permission can be stored in a data structure. The data structure contains link or reference of the original creator, the users that have permission to use the profile within time period for the permission and context for each user for which they have access to use the dummy profile.

In another embodiment, the process of FIG. 8 may be employed to form multiple dummy profiles. The profiles may be formed sequentially. For example, the framework may inquire the user to see if additional dummy profiles are to be created after step 840. If so, the process returns to step 820. Otherwise, the process terminates at step 850.

Figure 9:
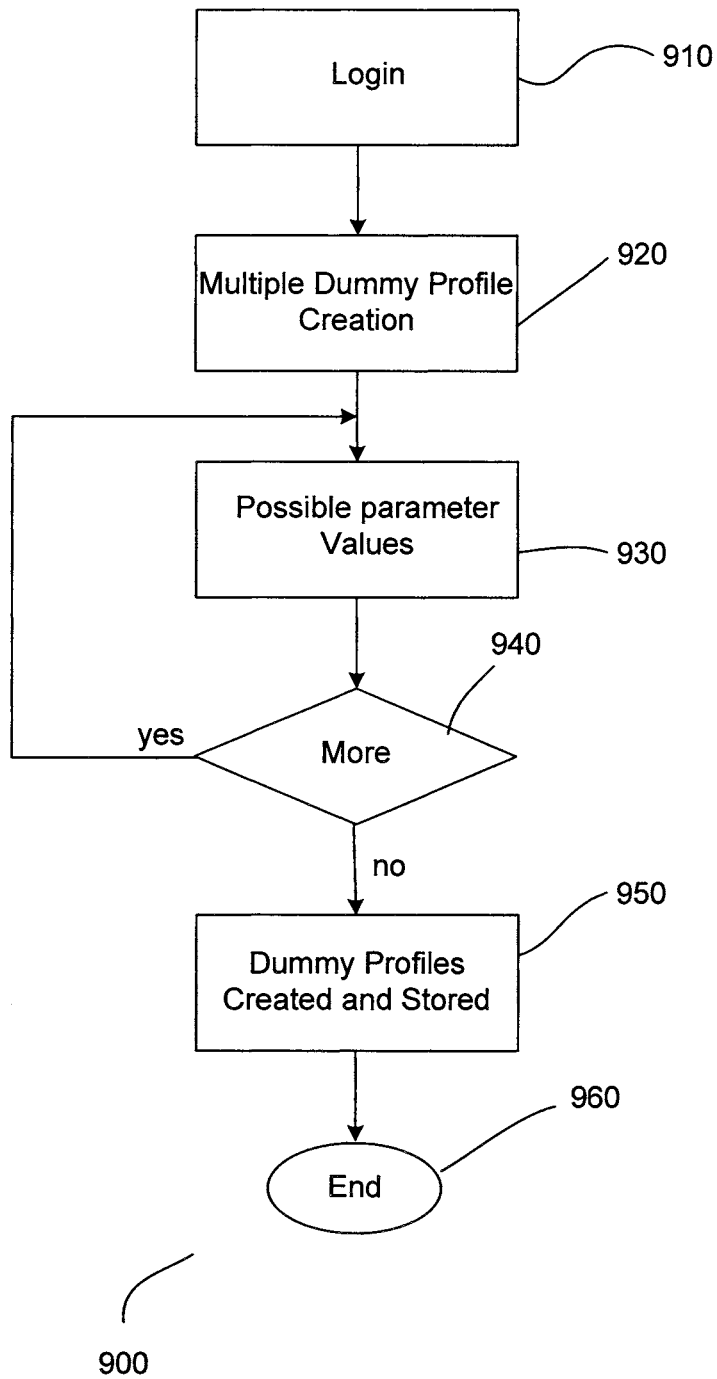
FIG. 9 shows an exemplary embodiment of a process for manually forming multiple dummy profiles.

FIG. 9 shows an embodiment of a process 900 for manually forming multiple dummy profiles. In one embodiment, a real user logs into the framework at step 910. The real user, for example, accesses the homepage of the social network portal and initiates the login process. The user may enter the username and password to login to the framework's UI. Once authenticated by the framework, the user is logged in. Once logged in, the user obtains authorship and responsibility over his/her actions.

At step 920, the user initiates a multiple dummy profile creation process to create dummy profiles. The multiple dummy profile creation process may be initiated through an event. For example, the user may click on a menu bar or command button on the framework's UI. Other approaches for initiating the multiple dummy profile creation process may also be useful. For example, the user may issue a command or calling an API through a remote or message passed call. Dummy profiles are created in the context and under the authenticated usage of the real user profile. The dummy profiles remain within the scope of the real user profile. In one embodiment, the user indicates the number of dummy profiles to be created.

In one embodiment, the user provides parameters and values of the dummy profiles at step 930. For example, the user inputs the parameters and values into the framework. In one embodiment, the user has the option to provide multiple values, including empty or non-presence of values for each parameter.

The process proceeds to step 940 to determine if there are more parameters and parameters values to process. The process returns to step 930 if there are more parameters and parameter values to process. Steps 930 and 940 are repeated until all parameters and parameter values have been processed.

At step 950, the profile parameters and corresponding profile parameter values are assigned to a data structure designated to store the dummy profiles. Additionally, the framework may be provided with login information, such as username and password for one or more external social network portals where the dummy profiles are intended to exist as a fictitious user profiles. The process terminates at step 960 after creating and storing the dummy profile.

In one embodiment, access permission to use a created dummy profile is restricted to the real user profile that created it. In some cases, the framework may provide data structures and methodologies for a different real user to obtain permission for using the dummy profile. Such permission can be granted for certain time duration as agreed by the original user who is the creator of the dummy profile. The access permission can be stored in a data structure. The data structure contains link or reference of the original creator, the users that have permission to use the profile within time period for the permission and context for each user for which they have access to use the dummy profile. In another embodiment, the process of FIG. 9 may be employed to form a single dummy profile.

Figure 10:
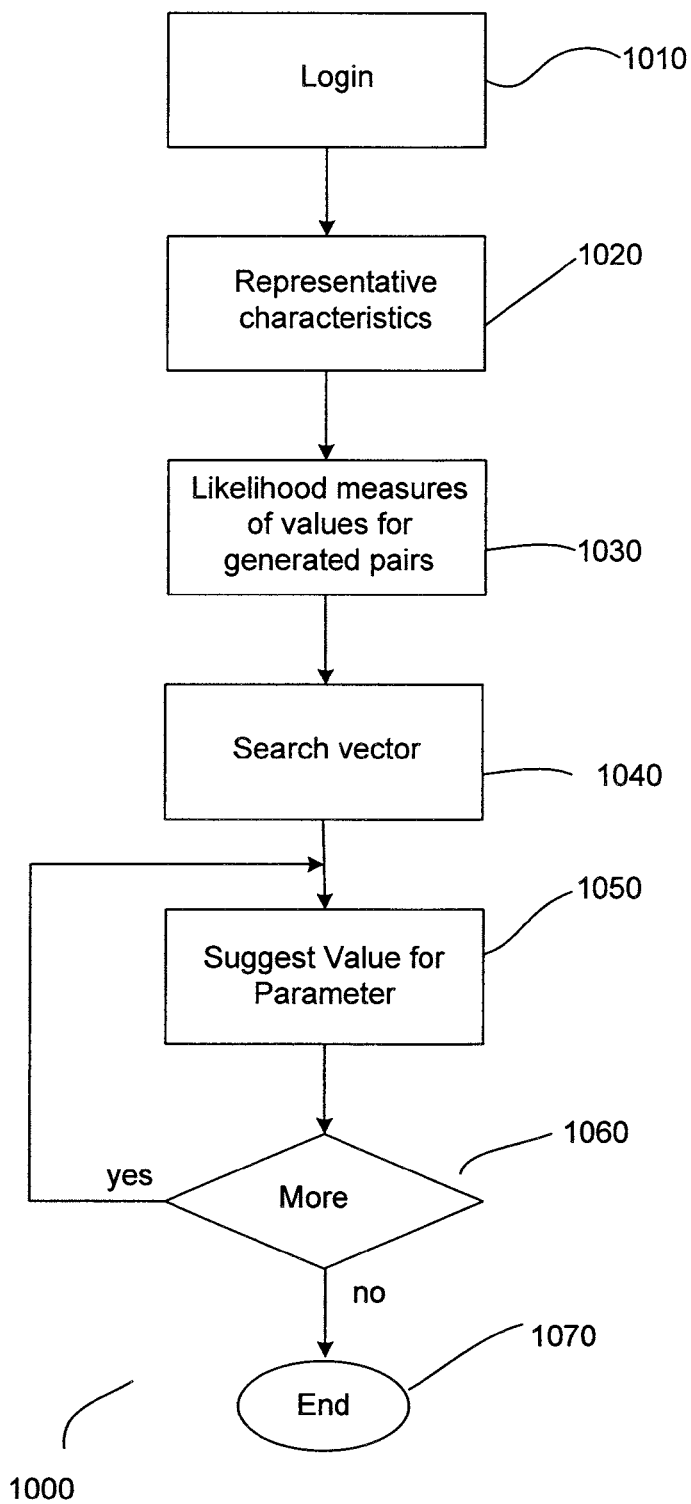
FIG. 10 shows an exemplary embodiment of a process for creating a dummy profile.

FIG. 10 shows an embodiment of a process 1000 for creating a dummy profile in the framework. In one embodiment, a real user logs into the framework at step 1010. The real user, for example, accesses the homepage of the social network portal and initiates the login process. The user may enter the username and password to log in to the framework's UI. Once authenticated by the framework, the user is logged in. Once logged in, the user obtains authorship and responsibility over his/her actions.

At step 1020, the user initiates a dummy profile creation process to create a dummy profile. The dummy profile creation process may be initiated through an event. For example, the user may click on a menu bar or command button on the framework's UI. Other approaches for initiating the dummy profile creation process may also be useful. For example, the user may issue a command or calling an API through a remote or message passed call. A dummy profile is created in the context and under the authenticated usage of the real user profile. The dummy profile remains within the scope of the real user profile.

In one embodiment, the user provides representative characteristics. The representative characteristics, for example, are in the form of tuples, such as (P, V). In one embodiment, a user provides a small number of representative characteristics. For example, the user may provide one or two representative characteristics. Providing other number of characteristics may also be useful.

At step 1030, the user provides a measure of likelihood to the framework for the creation of the dummy profile that represents a certain section of the desired characteristics. The measure of likelihood is not the exact statistical likelihood but a relative measure separating an instance of a variable from other instances. For example, the measure of likelihood may be in the form of a percentile, including undefined values. The measure of likelihood, for example, are provided for characteristics or parameters which the user wants in the profile and which have not been provided by the user as part of the tuple set.

The framework, at step 1040, generates a search vector based on the input tuple set. In one embodiment, the search vector is the addition of all vectors corresponding to the tuples of the tuple set provided by the user. For example, the system retrieves the corresponding vector of each tuple provided by the user. The retrieved vectors are added to form the search vector.

The framework suggests a parameter value for the parameter from the list of characteristics desired in the dummy profile at step 1050. In one embodiment, the framework suggests values for one characteristic at a time. As discussed, the characteristics correspond to parameters. In one embodiment, tuples with a parameter corresponding to a characteristic and their corresponding vectors are retrieved from the profile parameter index. The cosine distance based on the search vector is determined for each vector retrieved to derive a cosine distance value. The values of the retrieved tuples are sorted based on the cosine distance value, for example, from the closest to the farthest. The closer a tuple is, the higher its cosine distance value. A threshold is determined. The threshold is based on the measure of likelihood provided. For example, the threshold is based on the percentile value provided. Values having a cosine distance value less than the threshold are discarded. From the remaining values, the framework selects the one corresponding to the measure of likelihood for the characteristic provided by the user. The parameter and pair are determined for the selected characteristic. In the case that the measure of likelihood is undefined, tuples with non-zero cosine distance values are considered and a randomly chosen tuple is returned.

The process proceeds to step 1060 to determine if there are more characteristics to process. If there are, the process returns to step 1050. Steps 1050 and 1060 are repeated until all characteristics have been assigned a value, completing the dummy profile with profile parameter names and values. The process terminates at step 1070 after there are no more characteristics to process.

In one embodiment, the user does not need to provide a complete set of desired characteristics or parameters for creating a profile. A representative set of desired characteristics or parameters are sufficient for creating a profile. The remaining desirable characteristic or parameters which are not provided by the user are automatically created to facilitate the automatic profile creation. For example, the measure of likelihood provides the remaining desirable characteristics or parameters to the framework according to the representative characteristics or parameters provided.

In other embodiments, a dummy profile can be created by assigning a real user profile. All interactions with the dummy profile is retained with the original profile owner and can be shown to the assigned user only if the original profile owner grants access rights for specific interactions.

In one embodiment, a user profile index is created in the framework. The user profile index is created by choosing dummy profiles from all participating real users within the framework which can be collected. The dummy profiles are attributable to real characters. Alternatively, real profiles and corresponding profile parameters can be collected from the public domain. Collecting profiles from the framework and public domain may also be useful. The collected profile may be used to create user profile index using, for example, random indexing, as previously described with respect to profile parameter index. The user profile index can be used as a transferable component. For example, the user profile index may be provided to other users of the framework.

In one embodiment, the framework facilitates interactions by dummy profiles. Interactions are controlled by the real users. The real user may be the creator/owner of the dummy profiles. In some cases, a real user may borrow dummy profiles from other real users. Dummy profiles of other real users may participate in interactions through designated dummy profiles. Other types or configurations of interactions may also be useful.

In one embodiment, interaction pages may be employed for interactions. An interaction page may be used to depict a situation. The situation, for example, may be depicted through conversations happening among participating dummy profiles or a blog created by one dummy profile and commented by other dummy profiles. An interaction page may also be used to create a conversational blog where a dummy profile contributes content.

Figure 11:
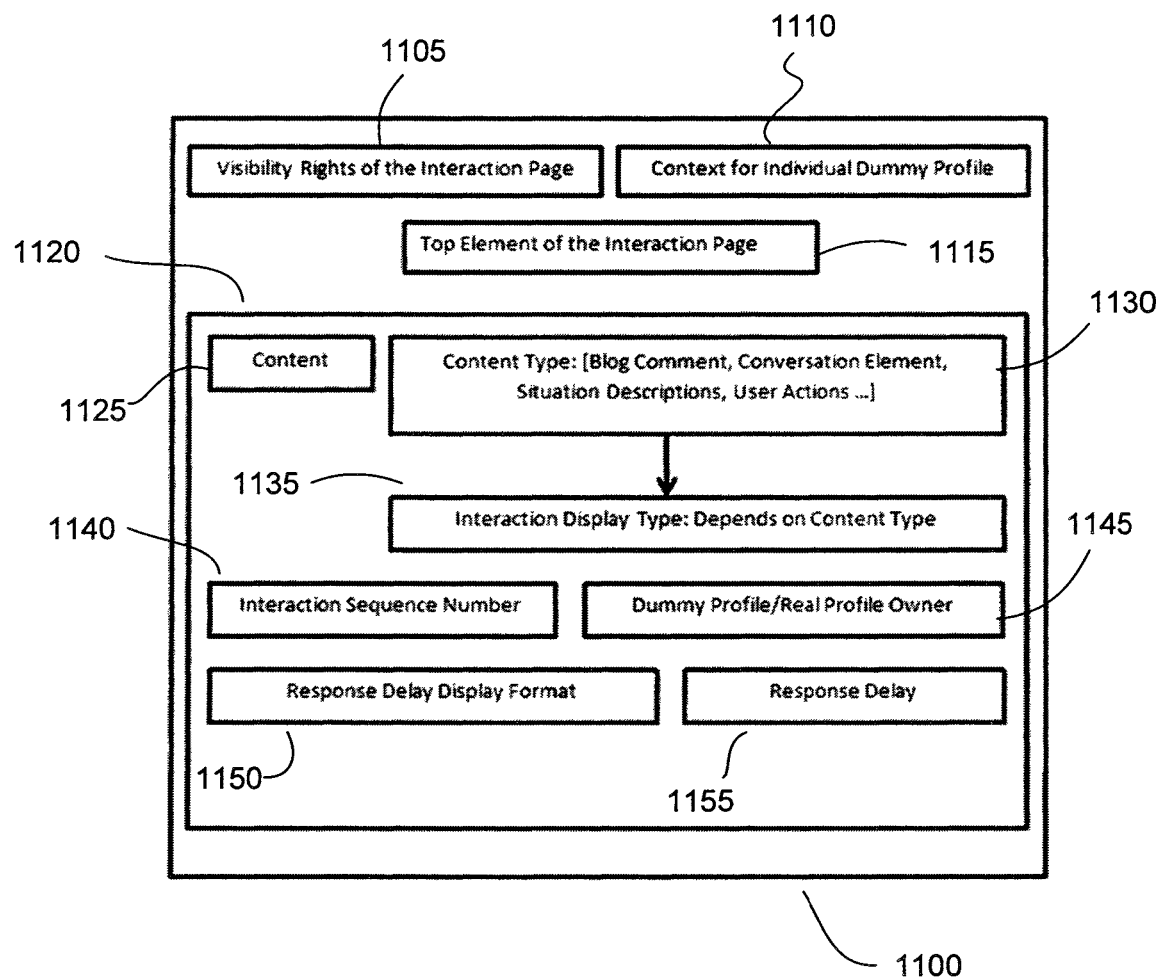
FIG. 11 shows an exemplary embodiment of an interaction page.

FIG. 11 shows an embodiment of an interaction page 1100. The interaction page, for example, is created for an individual interaction. For example, an individual interaction relates to a dummy profile providing digital content to a situation. In one embodiment, an interaction includes visibility rights component 1105, context component 1110, top element component 1115 and interaction element component 1120.

The visibility rights element indicates which user has the right to view the interaction page when published within the framework. The context component indicates which dummy profile is providing the content. The top element component shows the starting situation of the interaction related to the interaction page. For example, this may show the various options for the type of interaction intended by the profile owner.

The interaction element component includes various parameters related to the content of the interaction. In one embodiment, the interaction element component includes content parameter 1125, content type parameter 1130, interaction display parameter 1135, interaction sequence number parameter 1140, real profile owner parameter 1145, response delay display format parameter 1150 and response delay parameter 1155. Providing other parameters may also be useful.

The content parameter contains the digital content of the interaction. The digital content of an interaction can be text or audio or video, or a combination thereof. The type of content is provided in the content type parameter. For example, the user may indicate whether the content is a blog comment, conversation or conversation element. Other content type may also be useful. The interaction display parameter may depend on the type of the content. Depending on the content type, the user may select the desired interaction display.

The interaction sequence number parameter is provided, indicating relative sequence of the interaction relative to other interactions. The real profile owner parameter identifies the owner of the dummy profile assigned to provide the content of the interaction. As for the response delay display format and response delay parameters, they are used to control the time element of the interaction. For example, the user can set the response to the interaction in delay format using the response delay format parameter and the amount of delay in the response delay display parameter. Alternatively, the user may set the delay format in absolute terms, making the response delay parameter irrelevant. If the user sets the time in absolute term, an anomaly between subsequent interactions is checked for since no interaction is allowed to be occurring before a preceding interaction.

Figure 12:
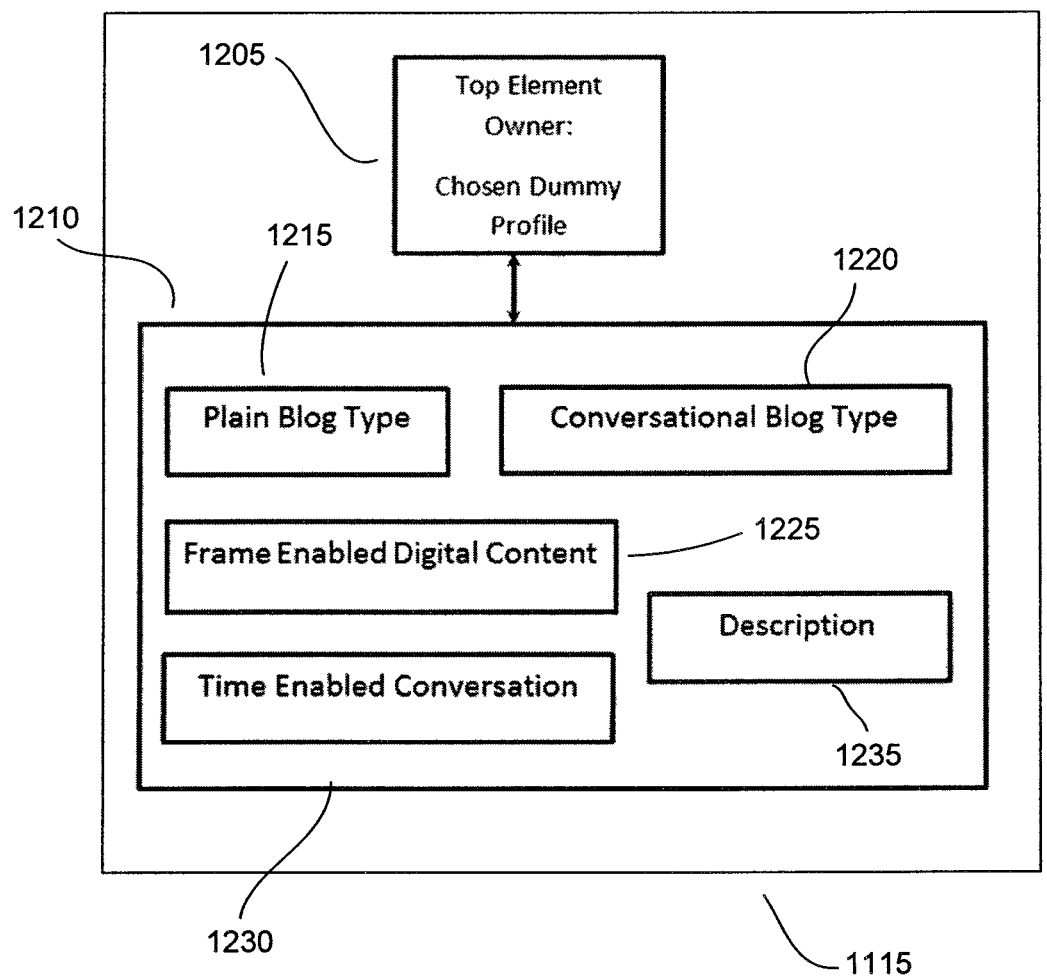
FIG. 12 shows an exemplary embodiment of a top element component.

FIG. 12 shows an embodiment of options provided in the top element component 1115. The options may appear, for example, by clicking on the top element component. The various options relate to the type of interaction intended by the user. In one embodiment, the options are shown in a selection interface 1210. The selection interface, for example, includes radio buttons for the types of interaction. Providing the selection interface having other types of responsive configurations may also be useful. In one embodiment, the types of the interaction include a plain blog type 1215, conversational blog type 1220, frame enabled digital content 1225 and time enabled conversation 1230. In one embodiment, a description 1235 radio button may be provided for the user to include description of the intended interaction type. Providing other types of interaction may also be useful. When the user clicks on a radio button corresponding to a type of interaction, the interaction element component 1120 of the interaction page will be set accordingly. For example, when the user selects the frame enabled digital type interaction, the user may have an option to publish a digitized photo. After an interaction page is deemed complete, it can be published within the framework. In one implementation of the framework, all dummy elements are visually shown to be dummy elements through one of the visual depiction elements along with other visual characters that represent the character or the dummy profile.

Interactions involving dummy profiles can also happen through multiple devices over a communication media in an asynchronous or synchronous manner or a person showing them in presence of the audience through a single device.

As discussed, content of an interaction page can be a blog. In one embodiment, an interaction page which is made to generate a blog contains the main blog written by a principal dummy profile deemed to be the blog owner. Other dummy profiles can be used to make comments in the blog page. The time element of each of the comments can be controlled.

In other embodiments, an interaction page can be a conversational blog. A conversational blog, for example, gives an impression that multiple users participated simultaneously and presented their content and the framework collates and publishes them together. Each of the users is actually represented with the help of a dummy profile. No time element for any interaction is present. However a date element can be present at the top of the page. Additionally other dummy profiles can be assigned to subsequent comments made to the conversational blog.

As described, interactions can contain comments or describe situations, each assigned to a dummy profile. The time element of each interaction is adjusted by the user and the framework verifies for anomaly. The time element of such interaction is shown based on the type of the interaction page or user's choice.

In one embodiment, the framework enables other users who have authorization (e.g., visibility rights) to access the interaction page and it becomes visible to them. Dummy profiles are shown with a visual element to be a dummy profile so that real users understand that they are dummy profiles.

While content is created specific to any character and such content being text written in a natural language, the text can be analyzed for classification. Using machine assisted author style identification methods, the conformity of a written text with the previous style of the character can be measured. The character creation activity and all its associated interactions become more realistic. If no previous writing of the character is available, such writings from the public domain or any other source can be searched based on the characteristics or profile parameters of the character. Once a collection of such materials are available, the author style identification can be performed.

Author style identification can also be useful when the contents are created in a collaborative environment. When other real users choose a dummy profile and in turn the associated character contributes towards comments which the character makes, the author style identification can help maintaining the desired conformity towards a certain style of comments.

The methodology of author style identification can be done according to the following paper: "Stopword Graphs and Authorship Attribution in Text Corpora, Suresh V.; Madhavan, C. E. V.; Arun, R.; IEEE International Conference on Semantic Computing, 2009", which is herein incorporated by reference for all purposes.

A collection of previous narratives from any given Individual Personal Profile is collected as body of sample text corpora for that profile. Each existing profile would have their corresponding text corpora. Any given text corpus is transformed into a statistical distribution using the gaps between any two successive stopwords of the corpus.

First, text corpus is transformed into stopwords or functional words, with non-functional words being replaced with representative character for gap. The representative character for gap is "- - - ". Gaps are the number of non-stopwords that occur between two successively occurring stopwords in a piece of text. The gaps between stopwords are counted and preserved. Association between two stopwords is given a weight based on the gaps that exist between them in the text under consideration. The probability distribution between pairs of stopwords is generated using the gap based weights. For each text corpus corresponding to any given profile, a corresponding probability distribution is generated. Similarity between any two probability distributions can be done using existing statistical methods. An example of such similarity measuring statistical method is the KL divergence. The output of the stylometric analysis is a 'closeness score' with each of the corpora corresponding to other profiles.

If the user intends to determine how close or conforming the current set of narrative for a given profile is to its previous narratives, the framework gives a closeness comparison to previous narratives of all chosen profiles. If the closest score does not match with the corresponding profile and is rather with a different profile, the user can be alerted that the narrative is deviating from the particular profile and inclining towards a different profile. The user can make changes accordingly and comply with conformity of narrative for that profile.

The framework may be used for various purposes. FIG. 1B is referred for an illustration of an example of a use of the framework. As an example, the framework may be used for marketing purposes. Using the framework for other purposes may also be useful.

Assume that a branding agency may dedicate for brand creation for a group of companies. The branding agency may have team members for this purpose. The team members may use the framework environment to create dummy profiles or fictitious characters. In this context, team members are real users of the framework environment. Each team member controls his/her respective fictitious characters in the framework environment.

The company is charged with a task of publishing a soap opera-like story. For example, the soap-opera like story is targeted to be published in first and second external environments, which are social media platforms. The first external environment may be Facebook while the second one may be Tumblr. The story may be written through text and pictures that are associated with fictitious characters. The story may include multiple scenes.

A scene may be generated by a team member using the framework environment. For example, team member A may use his/her fictitious characters and develop an interaction, such as a dialog thread, to create the scene in the framework environment. Each scene in the story may involve characters and a dialog thread (e.g., interaction element).

Team member A, after creating the scene, may publish the interaction element of the scene in the external environments. For example, Tumblr and Facebook publish their API, such as the POST call structure, that is used to create content in their environment. As such, content created in the framework environment is transferred to Facebook using its designated POST call and to Tumblr using its designated POST call. The process can be repeated for additional external environments.

In other cases, the framework may be employed to depict complex scenarios. For example, the framework can be used to create organizations and its employees to help understand relationships and interactions of the organizations and its employees. Additionally, the framework can be used to understand its needs, such as personnel, for new projects or develop business strategies based as well as other uses.

As described, the CG application may be embodied as an application. For example, the CG application may be embodied as a software application. The CG application may be integrated into an existing software application, such as a social media application, as an add-on or plug-in to an existing application, or as a separate stand-alone application. The existing software application may be a suite of software applications. The source code of the application may be compiled to create an executable code. The codes, for example, may be stored in a storage medium, such as one or more storage disks. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method for content creation comprising:
   collecting profile pages;
   analyzing the profile pages to build a profile parameter index using random indexing, the profile parameter index comprises vectors having d elements, wherein
      s/2 random elements of the d elements are selected to be equal to +1, where s is a seed number,
      s/2 random elements of the d elements are selected to be equal to −1, and remaining d elements is equal to 0; and
   creating a dummy profile based on the profile parameter index, wherein the dummy profile is a fictitious character having profile parameters based on input from a user of the profile parameter index, wherein control of the dummy profile is under the user.

2. The computer-implemented method of claim 1 wherein analyzing the profile pages comprises:
   generating a current profile page vector for a current profile page;
   analyzing a current parameter of the current profile page includes
      creating a current tuple from the current parameter, the current tuple having a current parameter name and a current parameter value,
      determining if the current tuple is unique,
      adding the current tuple to a tuple array if it is unique,
      generating a current initial profile parameter index vector corresponding to the unique current tuple,
      adding the profile page vector with the current initial profile parameter index vector to form a current profile parameter index vector, and
      adding the current profile parameter index vector to the profile parameter index, and repeating the process of analyzing the current parameter until all parameters of the current profile page have been analyzed; and
   repeating generating profile page vector and associated process of analyzing current parameters until all the profile pages have been analyzed.

3. The computer-implemented method of claim 2, wherein if the current tuple is not unique, comprises:
   retrieving a corresponding profile parameter index vector of a matching tuple in the tuple array;
   adding the current profile page vector to the corresponding profile parameter index vector to form a revised profile parameter index vector; and
   replacing the corresponding profile parameter index vector of the matching tuple with the revised profile parameter index vector.

4. A computer-implemented method for content creation comprising:
   collecting profiles of different users;
   analyzing the profiles to build a profile parameter index using random indexing, the profile parameter index comprises vectors having d elements, wherein
      s/2 random elements of the d elements are selected to be equal to +1, where s is a seed number,
      s/2 random elements of the d elements are selected to be equal to −1, and remaining d elements is equal to 0; and
   creating a dummy profile based on the profile parameter index, wherein the dummy profile is a fictitious character having profile parameters based on input from a user of profile parameter index, wherein control of the dummy profile is under the user.

5. The computer-implemented method of claim 4 wherein the profile parameter index comprises vectors.

6. The computer-implemented method of claim 4 wherein the profile parameter index is created using random indexing.

7. The computer-implemented method of claim 4 wherein the vectors of the profile parameter index are normalized vectors.

8. The computer-implemented method of claim 4 comprising creating an array of unique tuples with parameter names and parameter values.

9. The computer-implemented method of claim 8 wherein:
   the profile parameter index comprises vectors; and
   tuples are assigned corresponding vectors of the profile parameter index.

10. The computer-implemented method of claim 4 wherein analyzing the profiles comprises:
    generating a current profile page vector for a current profile;
    analyzing a current parameter of current profile include creating a current tuple from the current parameter, the current tuple having a current parameter name and a current parameter value, determining if the current tuple is unique, adding the current tuple to a tuple array if it is unique, generating a current initial profile parameter index vector corresponding to the unique current tuple, adding the profile page vector with the current initial profile parameter index vector to form a current profile parameter index vector, and adding the current profile parameter index vector to the profile parameter index, and repeating the process of analyzing the current parameter until all parameters of the current profile page have been analyzed; and repeating generating profile page vector and associated process of analyzing current parameters until all the profiles have been analyzed.

11. The computer-implemented method of claim 10, wherein if the current tuple is not unique, comprises:

retrieving a corresponding profile parameter index vector of a matching tuple in the tuple array;

adding the current page vector to the corresponding profile parameter index vector to form a revised profile parameter index vector; and replacing the corresponding profile parameter index vector of the matching tuple with the revised profile parameter index vector.

12. The computer-implemented method of claim 4 wherein creating the dummy profile comprises creating the dummy profile manually.

13. The computer-implemented method of claim 4 wherein creating the dummy profile comprises creating the dummy profile automatically.

14. The computer-implemented method of claim 13 wherein creating the dummy profile automatically comprises:

providing a first set, the first set comprises parameter names and associated parameter values;

providing a second set, the second set comprises parameter names and associated measure of likelihoods; and generating parameter values for the parameter names in the second set, wherein the parameter values are from the profile parameter index based on the measure of likelihoods.

15. The computer-implemented method of claim 14 wherein the first set comprises representative characteristics.

16. The computer-implemented method of claim 4 further comprising measuring style of expression of a dummy profile.

17. The computer-implemented method of claim 16 wherein measuring style of expression of the dummy profile comprises determining a closeness score.

18. A non-transitory computer-readable medium having stored thereon program code, the program code executable by a computer to:

collect profiles;

analyze the profiles to build a profile parameter index using random indexing, the profile parameter index comprises vectors having d elements, wherein s/2 random elements of the d elements are selected to be equal to +1, where s is a seed number, s/2 random elements of the d elements are selected to be equal to −1, and remaining d elements is equal to 0; and create a dummy profile based on the profile parameter index, wherein the dummy profile is a fictitious character having profile parameters based on input from a user of the profile parameter index, wherein control of the dummy profile is under the user.

19. A system comprising:

a non-transitory memory device for storing computer-readable program code; and a processor in communication with the memory device, the processor being operative with the computer-readable program code to:

collect profiles;

analyze the profiles to build a profile parameter index using random indexing, the profile parameter index comprises vectors having d elements, wherein s/2 random elements of the d elements are selected to be equal to +1, where s is a seed number, s/2 random elements of the d elements are selected to be equal to −1, and remaining d elements is equal to 0; and create a dummy profile based on the profile parameter index, wherein the dummy profile is a fictitious character having profile parameters based on input from a user of the profile parameter index, wherein control of the dummy profile is under the user.

* * * * *